(12) United States Patent
Holdman et al.

(10) Patent No.: US 12,444,113 B2
(45) Date of Patent: Oct. 14, 2025

(54) CUSTOMIZED ANIMATED ART

(71) Applicant: ANIMATE ART LLC, Lehi, UT (US)

(72) Inventors: Thomas E. Holdman, Highland, UT (US); James Gaskin, Lindon, UT (US); Brandon Crapo, Provo, UT (US); Ho Yun Ki, Provo, UT (US); Alan Knight, Lehi, UT (US)

(73) Assignee: Roots of Humanity Foundation, Inc., Lehi, UT (US)

( * ) Notice: Subject to any disclaimer, the term of this patent is extended or adjusted under 35 U.S.C. 154(b) by 0 days.

(21) Appl. No.: 18/767,808

(22) Filed: Jul. 9, 2024

(65) Prior Publication Data

US 2024/0362843 A1     Oct. 31, 2024

Related U.S. Application Data

(63) Continuation of application No. 17/859,365, filed on Jul. 7, 2022, now Pat. No. 12,033,260.

(60) Provisional application No. 63/219,120, filed on Jul. 7, 2021.

(51) Int. Cl.
*G06T 13/20* (2011.01)
*G06T 3/40* (2024.01)

(52) U.S. Cl.
CPC .............. *G06T 13/205* (2013.01); *G06T 3/40* (2013.01)

(58) Field of Classification Search
CPC .................................. G06T 13/205; G06T 3/40
See application file for complete search history.

(56) References Cited

U.S. PATENT DOCUMENTS

| | | | |
|---|---|---|---|
| 8,704,879 B1* | 4/2014 | Cheng | G06F 3/013 348/51 |
| 9,342,914 B2* | 5/2016 | Turner | G06T 13/20 |
| 9,367,203 B1* | 6/2016 | Costello | G06F 3/04815 |
| 10,726,631 B1 | 7/2020 | Ha | |
| 10,831,267 B1 | 11/2020 | Golard et al. | |
| 2018/0204380 A1 | 7/2018 | Kumar et al. | |
| 2020/0133618 A1 | 4/2020 | Kim | |
| 2020/0143238 A1 | 5/2020 | Ramnath et al. | |
| 2020/0160586 A1 | 5/2020 | Walls et al. | |
| 2020/0320592 A1 | 10/2020 | Soule et al. | |
| 2021/0065454 A1 | 3/2021 | Goodrich et al. | |
| 2021/0119884 A1 | 4/2021 | Kim et al. | |
| 2021/0255328 A1 | 8/2021 | Sanjeev et al. | |

\* cited by examiner

*Primary Examiner* — Lixi C Simpson
(74) *Attorney, Agent, or Firm* — Dentons Durham Jones Pinegar; Sarah W. Matthews; Lilly Godfrey

(57) ABSTRACT

A method for providing an animated art experience to a user includes a user device receiving an image of an art piece selected by the user. The user device obtains information about the art piece. The user device presents a three-dimensional (3D) animated image that corresponds with the selected art image. Upon receiving an action by the user caused by a rotation or tilt of the user device, the user device provides a depth perspective view in correlation with the action and associated viewer angle of the art image such that further portions of the art image become visible. A background and a foreground of the image appear to move naturally as actions and associated viewer angles change.

20 Claims, 20 Drawing Sheets

Machine-Readable Storage Medium
230

| 232 | Obtain user information |
| 233 | Receive an image of an art piece |
| 234 | Obtain/Receive information about the art piece |
| 235 | Present a 3D animated image |
| 236 | Receive an action by the user |
| 237 | Present a dynamic or sensory response |
| 238 | Guide the user to a next physical art piece |

FIG. 23

CUSTOMIZED ANIMATED ART

CROSS REFERENCE TO RELATED MATTER

This is a continuation of U.S. application Ser. No. 17/859,365, filed Jul. 7, 2022, titled CUSTOMIZED ANIMATED ART, ("the '365 application"), which has issued as U.S. Pat. No. 12,033,260 on Jul. 9, 2024 which claims priority to the Jul. 7, 2021 filing date of U.S. Provisional Patent Application No. 63/219,120, titled CUSTOMIZED ANIMATED ART ("the '120 Provisional application") and is hereby made pursuant to 35 U.S.C. § 119 (e). The entire disclosure of the '365 Application and the '120 Provisional application are incorporated herein.

BACKGROUND

One can easily become immersed in paintings and sculptures in an art museum. Art communicates information and ideals that allow people to unearth historical events, analyze expression of ideas, stimulate the imagination, and interpret the abstract, among other things.

BRIEF DESCRIPTION OF THE DRAWINGS

The accompanying drawings illustrate various implementations of the principles described herein and are a part of the specification. The illustrated implementations are merely examples and do not limit the scope of the claims.

FIG. 23 shows a computer readable storage medium for providing an animated art experience, according to an example of the principles described herein.

Throughout the drawings, identical reference numbers designate similar, but not necessarily identical, elements.

DETAILED DESCRIPTION

Figure 1A:
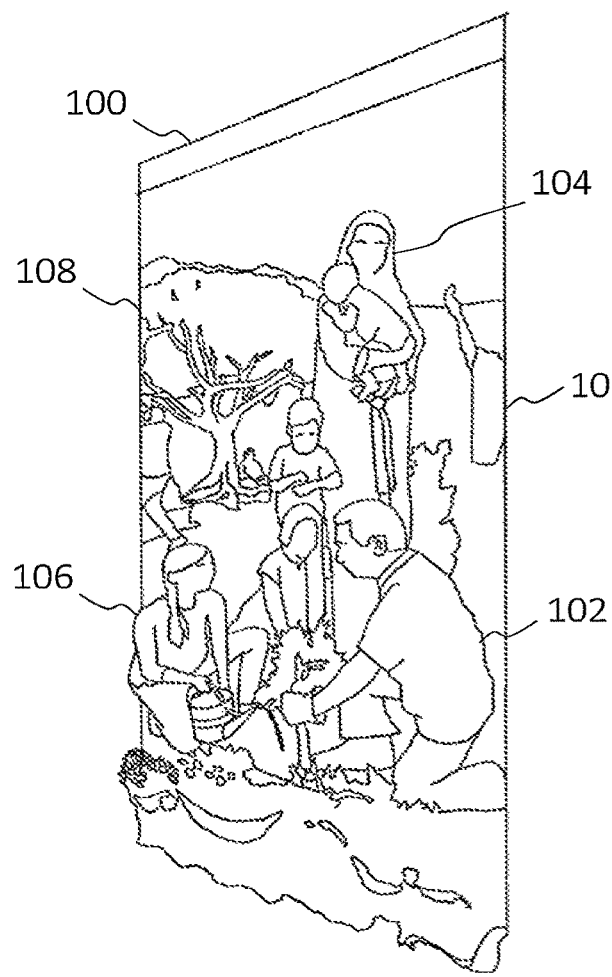
FIG. 1a shows an art image displayed on a user device at an angle, according to an example of principles described herein.

The following describes an art experience that is enhanced with a user device. The art experience includes visual and auditory extensions and user interactive functionality with art pieces. The user is provided with a tailored experience while being guided to various art pieces.

A user may enter an art museum, for example, or another venue with art pieces. Standing in front of an art display, the user holds the user device up to the art piece for the camera portion of the user device to receive an image of the art piece. The user device provides the image on its display. The user device uses the art piece to obtain or receive information about the art piece using recognition program instructions. With this information, the user may engage with the image displayed on the user device to learn about the art piece and explore various aspects of the art piece.

The user device receives user input, such as through touch or voice command, and provides dynamic responses by animating the art image or providing visual or auditory feedback. The responses are dynamic because the data to be displayed changes based on parameters such as user information, art piece, time, etc. The dynamic responses can be regularly updated and/or unique or coded specifically for the user in real time. The responses may be tailored appropriately to the user's age or other information that is unique to the user, or as provided by settings entered by the user. Responses may include movement of animals and natural elements, for example. Responses may further include sounds and information. Responses may also include further visual elements that extend beyond what is provided in the physical art piece alone. These measures add further depth and enrichment to the original art piece. In this manner, the art image virtually becomes alive and takes on a life of its own.

Furthermore, the art experience provided by the user device extends beyond interactions between the art piece and the user to a tailoring of the experience between the user and other people and surroundings around the user. For example, the user device may obtain images of people that are standing in front of the art piece and may remove them from the image displayed on the user device. The user device may also receive information about people in the art museum and may use the information to guide the user from congested areas to less congested areas. In this manner, the user has an uninterrupted flow of viewing art pieces from the beginning to the end of a collection of art pieces. The overall experience of attending an art museum or other venue is thus personalized to each given user.

An example method for providing an animated art experience to a user includes a user device receiving an image of an art piece selected by the user. The user device obtains information about the art piece. The user device presents a three-dimensional (3D) animated image that corresponds with the selected art image. Upon receiving an action by the user caused by a rotation or tilt of the user device, the user device provides a depth perspective view in correlation with the action and associated viewer angle of the art image such that further portions of the art image become visible. A background and a foreground of the image appear to move naturally as actions and associated viewer angles change. For example, as the user moves with their user device around a three-dimensional animate image that has been presented to them, motion parallax can be used to make objects moving at a constant speed across the frame to appear to move a greater amount if they are closer to an the user than they would if they were at a greater distance. Other techniques, such as contrast, texture, color, light, and shadow can also be used to make the three-dimensional image appear to move naturally as actions and associated viewer angles change.

Another example method for providing an animated art experience to a user includes receiving an image of an art piece selected from a user device. The user device obtains information about the art piece. The user device presents a 3D animated image that corresponds with the selected art piece. Upon receiving an action by the user in conjunction with the 3D animated image, the user device presents at least one dynamic or sensory response of the 3D animated image in accordance with the action of the user.

Another example method for providing an animated art experience to a user includes obtaining information about individuals and objects that are in a proximity to the user. The user device receives an image of an art piece from a user device. The user device obtains information about the art piece. The user device then presents a 3D animated image that corresponds with the selected art piece and that provides a dynamic response to a user input. The user device then guides the user to a next art piece based on the individuals and objects in the proximity to the user.

In another example, the method further provides 360 degrees of navigation in which the user may view the art image from different angles. In another example, the method further includes presenting at least one visual or aural layer in conjunction with the art image. In another example, the method includes presenting the visual or aural layer with a dynamic or sensory response. In another example, the method includes providing a depth perspective with the visual layer such that when a user views the art image at different angles, different portions of the art image become visible, and the background and foreground appear naturally as the viewer angles change. In another example, the method includes recognizing a presence of persons and surroundings in an environment in which the art image is present, and guiding the user to other art images in a manner that balances the presence of persons within the environment.

In an example, the method includes automatically removing an obstruction (such as an object or a person) that comes within a camera view of the user so that the art image remains unobscured even when an actual view or the camera view of the user would otherwise be blocked by the obstruction. In another example, the method includes scaling and formatting the art image to fit within the user screen regardless of the distance of the user from the art image or movement of the user with respect to the art image.

In an example, the method includes receiving an image of a physical object selected by the user. Upon obtaining information about the physical object, the user device presents a 3D animated image that corresponds with the selected physical object. The user device also presents at least one dynamic or sensory response of the 3D animated image in accordance with the information obtained about the physical object.

In another example, the user device recognizes at least one person or physical object that is not stored in a database. The user device presents a 3D animated image that corresponds with the at least one person or physical object and presents at least one dynamic or sensory response of the 3D animated image.

In an example, the method includes obtaining personal information about the user. Upon receiving an art image from a user device, the user device obtains information about the art image. The user device presents a 3D animated image that corresponds with the selected art image. Upon receiving an action by the user in conjunction with the art image, the user device presents at least one dynamic or sensory response of the 3D animated image in accordance with at least one of the action of the user, the information about the user, and the user surroundings.

In an example, the method includes providing to the user, based on the personal information of the user, a communication that is related to the 3D animated image. The method further includes presenting at least one dynamic response of the 3D animated image in accordance with the information about the user.

In an example, the method includes providing the communication in a language based on the personal information obtained about the user. In an example, the method further includes providing the communication in at least one of visual, auditory, or braille format. In another example, the method includes providing different levels of communication, and providing the communication that is related to the 3D animated image at a level of communication that is based on the personal information about the user.

In an example, the method includes detecting information about the surroundings of the user and providing communication to guide movement of the user based on the information about the surroundings. In an example, the method includes providing communication to guide movement of the user based on the personal information of the user.

In another example, a method for providing animated art to a user includes obtaining personal information about the user. The method also includes obtaining information about individuals and objects that are in a proximity to the user. Upon receiving an art image from a user device, the user device obtains information about the art image and presents a 3D animated image that corresponds with the selected art image. Based on the personal information of the user, the user device provides a communication that is related to the 3D animated image. The user device also presents at least one dynamic response of the 3D animated image in accordance with the information about the user. The user device also guides the user to a next art image based on the individuals and objects in the proximity to the user.

In an example, the method further includes detecting information about the user, including at least one of audio, visual, and tactile information. Based on the information, the user device provides a corresponding communication that is related to the 3D animated image.

In an example, the method further includes presenting the dynamic response of the 3D animated image to reflect an age and language of the user.

As described above, to present a 3D art image or 3D animated image, a user device obtains an image of an art piece. For example, the user device may recognize particular art pieces. As a particular example, the user device may access a database of art pieces and compare the characteristics, e.g., lines, colors, etc., of the obtained image, to identify the art piece.

Within an image of an art piece, sub-images may be identified. For example, in an art piece of a boat crossing a river in winter, the user device may perform image analysis, such as pixel analysis, to recognize patterns or elements, such as lines, colors, etc. within the image. The user device may then match these elements to images stored in a database to identify the sub-images, e.g., foreground, background, ice floats, the boat, characters within the image of the art piece, etc.

These elements, or sub-images, may be recognized through the program instructions on the user device. This may be an automatic recognition application or a pre-supplied recognition application whereby certain points of interest are pre-determined within a larger image. The user device may then detect those sub-images and make them interactive. In other words, the user device obtains the image and prepares it for animation by matching the captured image with a database of stored images. In an example, this matching is done by recognizing patterns or elements in high contrast and high contour areas. When these recognized patterns between the captured image and a stored image in the database match to a pre-determined confidence level, the user device may indicate that a match has been found.

As described below, the user device recreates a two-dimensional image into a 3D interactive image. That is, the captured image or the recognized image is replaced with a 3D model that is modeled and textured with 3D modeling and animation applications. When the 3D interactive image includes animation, the modeling also provides the model movement by using joints and animation about which the model is manipulated. In some examples, this may include removing portions of the 2D image and filling in the missing portions with a new background. In an example, the user device may implement machine learning to automatically detect objects that may be rendered in 3D. The steps of rendering the 3D model and replacing the missing portions where the 2D image was omitted may be accomplished beforehand or performed automatically using machine learning (e.g., generative adversarial networks and style transfer). Three aspects of 3D are described as follows:

Depth of the Images

Depth of an art image is achieved by the user device separating the flat 2D image into layers, which may be called natural depth layers, and then projecting the natural depth layers into a 3D environment. The user device separates sub-images contained within an art image. For example, an image with sub-images of a background (e.g., landscape, horizon, and sky) and multiple foregrounds (e.g., people, buildings, road signs) may each have a background sub-image and a foreground sub-image isolated from the art image. The user device may cut, trace, or otherwise obtain the sub-image from the art image. The sub-image is then placed in a depth plan of a 3D environment.

Multi-Directional Viewing

In an example, the user device uses a depth plan template or otherwise creates a depth plan. With a depth plan, the position or direction of an object appears to differ when viewed from different positions. In other words, the user device creates a parallax effect when the user is positioned in front of the art and shifts their view from side to side. In effect, relatively near objects may shift more than distant objects in the same or similar manner as experienced when viewing real scenes. Because of the parallax, the user can view the image through the user device from different angles and see different content.

If the art image, being 2D, has no art behind the sliced out sub-image, new sub-images (not present in the 2D art image) may be inserted to provide a seamless look in the 3D rendering. Thus, when viewed from the right, the user can see more into the left side of the 3D environment. When viewed from the left, the user can see more into the right side. This viewing capability is also present for other angles, such as up and down, etc.

Moreover, an art image may be connected to other nearby art images, so that see into those other images (from the main image) if you glance at a sharp enough angle.

How Images are Animated

Animation is accomplished by the user device slicing a sub-image (e.g., animal, etc.), then further slicing that sub-image into moving parts (e.g., head, legs, tail, etc.) and then defining, or "rigging," the moving parts (e.g., limbs and joints) of the full set of sub-images. Once a set of images is rigged, the user device defines animation paths and loops for each rigged component. For example, the user device may move the legs to make it appear as though the animal is walking.

In this example, the whole model is rigged and then movements warp the 3D model to accommodate new positions of rigged elements. For example, if the animal is walking, the legs, which are connected to the body will move and the body will warp to accommodate the new position of the legs so that the model stays fully intact.

Note that an animation may have one movement sequence associated with it or it may have multiple movement sequences that are randomly shown. For example, a man may be shown waving his hand in one sequence, tipping his hat in another sequence, and doing a dancing jig in another sequence, all of which may be randomly shown as responses to user input.

Backgrounds and static elements, including weather or colors, may also change. For example, a sunny background may turn story. Lighting and shading may change. Such changes may be elicited by user input, occur automatically or randomly, or result from other action.

Figure 1B:
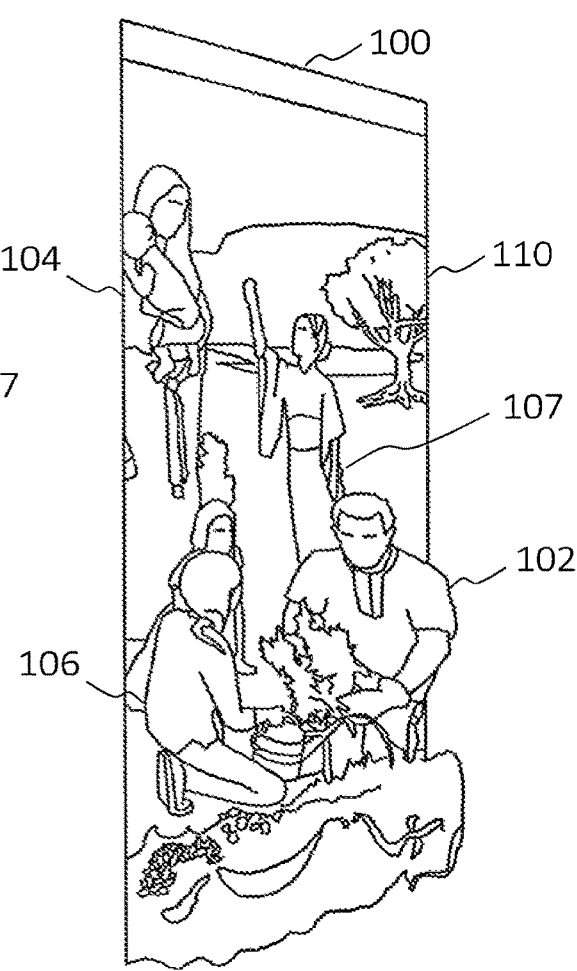
FIG. 1b shows an art image displayed on a user device at an angle, according to an example of principles described herein.

Various illustrations will now be described that show examples of art experiences for a user, according to principles described herein. Illustrations will be discussed according to flowcharts that associated with them. Turning to FIG. 1a, an art image 100 on a user device (not shown) is provided as viewed from a first angle. FIG. 1b shows the art image 100 as viewed from a different angle. The angled view in FIG. 1a illustrates a man 102 starting a fire with children 106. A woman 104 stands behind the man 102 and is holding a baby. A partial view of a girl 107 raising her arm is also shown behind the man 102. A tree 108 is shown in the distance. FIG. 1b, on the other hand, shows additional rendering of the art image 100. The girl 107 raising her arm is fully in view from the angle in FIG. 1b. A second tree 110 is visible in the distance. The tree 108 in FIG. 1b is no longer visible. Thus, different viewing angles provide different aspects on the user device. The different aspects may include, or not include, various components in the original art piece from whence the image was taken. This provides an enriched viewing experience not possible with a standalone art piece.

Also, the smart rendering allows a 3D viewing experience with the characters and objects having three dimensions. A user views people and objects from the various views as if they have three dimensions. Examples include that a portion, a substantial portion, or even an entire 360 view of a person or object may be visible using the various views. Also, the 3D rendering provides an environment with depth such that the characters and objects appear to be spaced apart within a 3D framework. The 3D viewing experience with spatial awareness is another manner in which the smart rendering adds value to a user experience.

Figure 19:
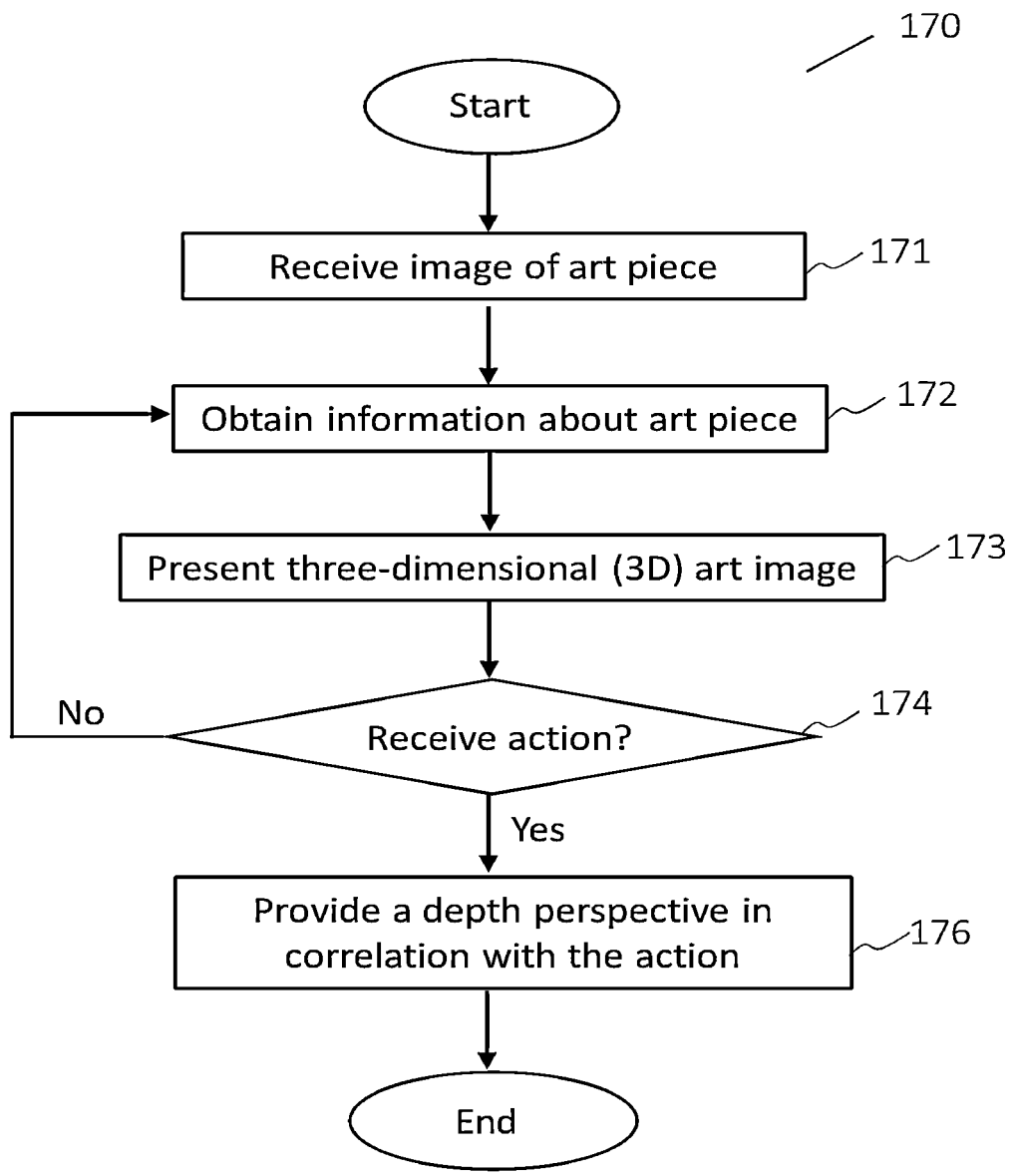
FIG. 19 shows a flowchart of a method to provide a depth perspective in correlation with an action of a user, according to an example of principles described herein.

With reference to FIG. 19, a user device receives 171 an image of an art piece and obtains 172 information, as described above, about the art piece. The user device presents a 3D art image of the art piece on a display of, or associated with, the user device as described above (step 173). If the user device receives an action (step 174) caused by a rotation or tilt of the user device, then the user device provides a depth perspective view in correlation with the action and associated viewer angle of the art image. A depth perspective view includes further portions of the art image that may be visible as if the user were looking through a window at a different angle. Also, a background and a foreground appear to move as actions and associated viewer angles change. As seen in FIGS. 1a and 1b, the depth can be seen, for example, by the locations of the man 102, woman 104, and tree 108. When the view changes, the depth of the man 102, woman 104, and tree 108 may still be seen in the 3D rendering as shown at a different angle.

Figure 2:
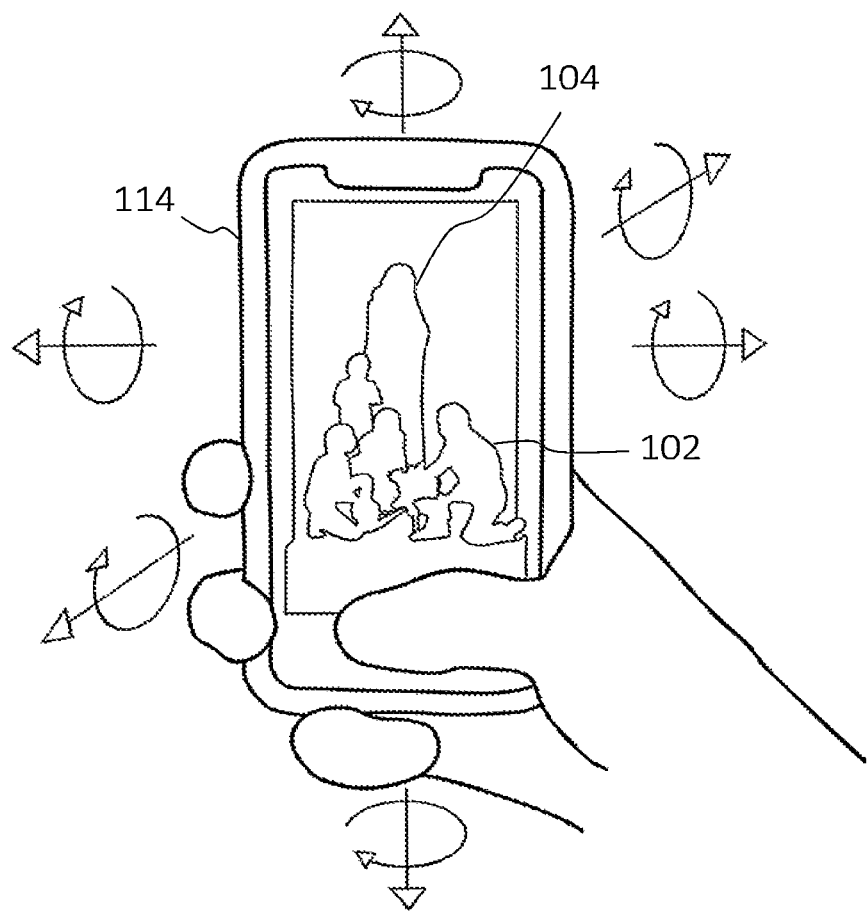
FIG. 2 shows an example of directions that a user device may be moved, according to an example of principles described herein.

FIG. 2 illustrates the user device 114 with arrows to indicate the many directions that the user device 114 can be moved. Particularly, the user device 114 may be moved, relative to the user, horizontally, vertically, forward and backward. In addition, the user device 114 may be turned relative to three-dimensional axes (X-axis, Y-axis, Z-axis). The user device 114 may further be moved or turned in any combination of the aforementioned directions. In an example, the views that appear on the user device 114 will reflect movement around the art image 100 as if the art image 100 were stuck in the same location relative to the user device 114 when the art image 100 was originally displayed on the user device 114. Once the art image 100 appears on the user device 114, movement of the user device 114 is relative to the art image 100 as if the art image 100 is immobilized relative to the earth.

The user device may include a number of positioning and motion sensors that can detect the position, angle, and movement of the user device. Data collected from detecting the position, angle, and movement of the user can be used to estimate viewing angle and relative movement of the user device which can then be used to make commensurate adjustments to the reproduced digital art image 100 displayed on the user device. For example, if the user device is moved to the right and slightly swiveled relative to a Z-axis that extends vertically relative to the earth, the view of the art image 100 may also move to the right of the art image 100 and slightly swiveled relative to the Z-axis. This allows the user to view deeper into the image's left portion as if they moved to the right of a window and peered outside. All of the depth layers of the reproduced digital image may also move in relation to this new viewpoint.

In another example, the art image 100 reflects the position or movement of the user device 114 relative to the actual physical art piece. Thus, a movement of the user device 114 to the right of the art piece will show up on the user device 114 with a view from the position that reflects the movement relative to the art piece.

Figure 3:
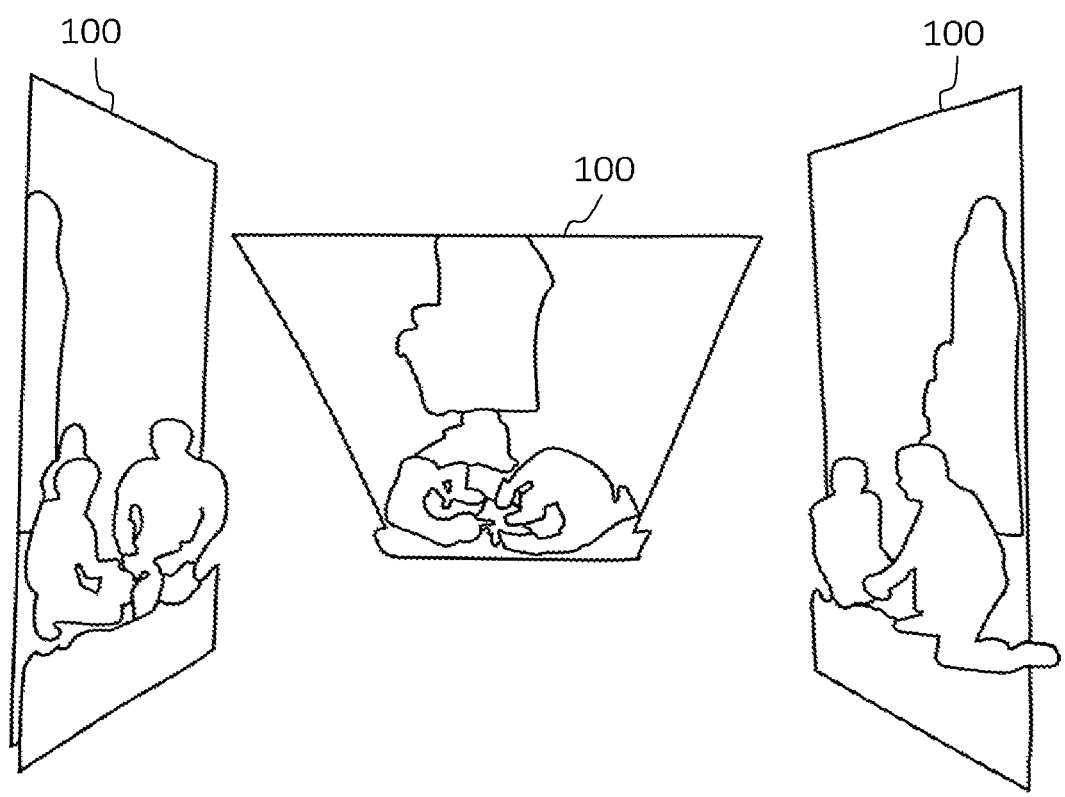
FIG. 3 shows an example of views of an art image associated with moving a user device, according to an example of principles described herein.

Turning to FIG. 3, examples of various viewing angles of an art image 100 are shown. The left image is viewed from the left of the art image 100. The middle image is viewed looking down on the image. The right image is viewed from the right of the art image 100. As can be seen in each of these images, the content that is displayed, as well as the response is based on the angle of the user device.

Figure 4:
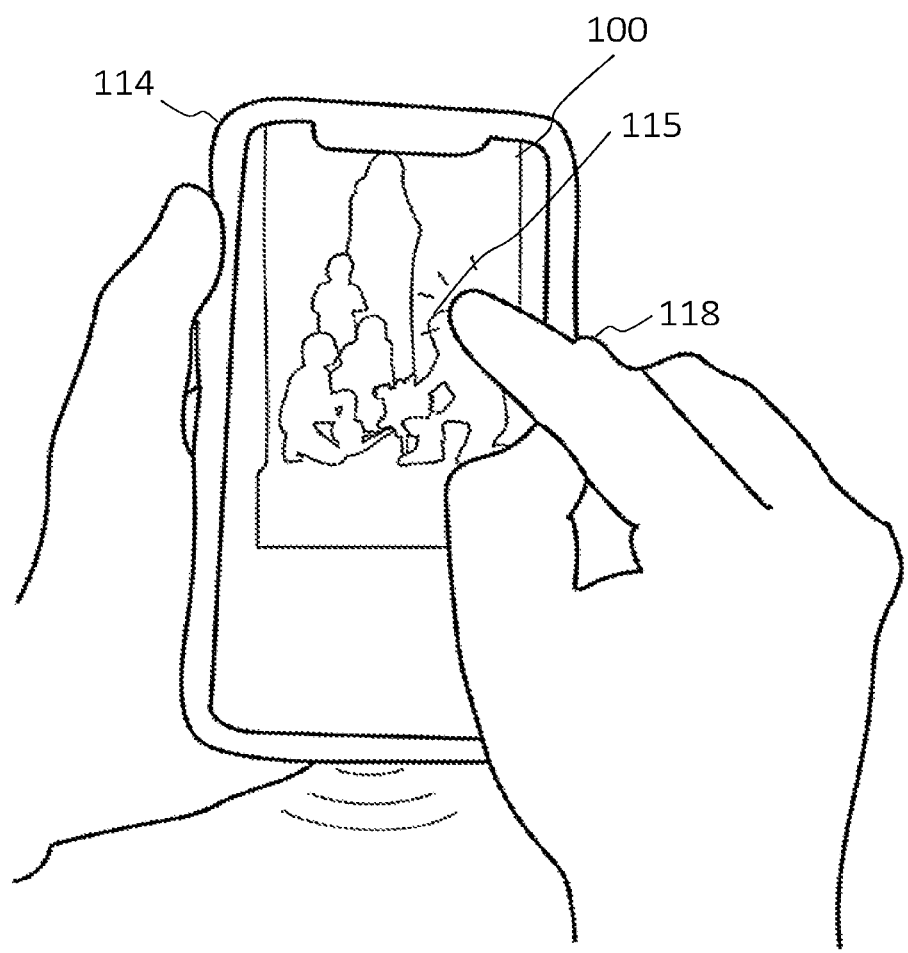
FIG. 4 shows an example of user interaction with an art image on a user device, according to an example of principles described herein.
Figure 20:
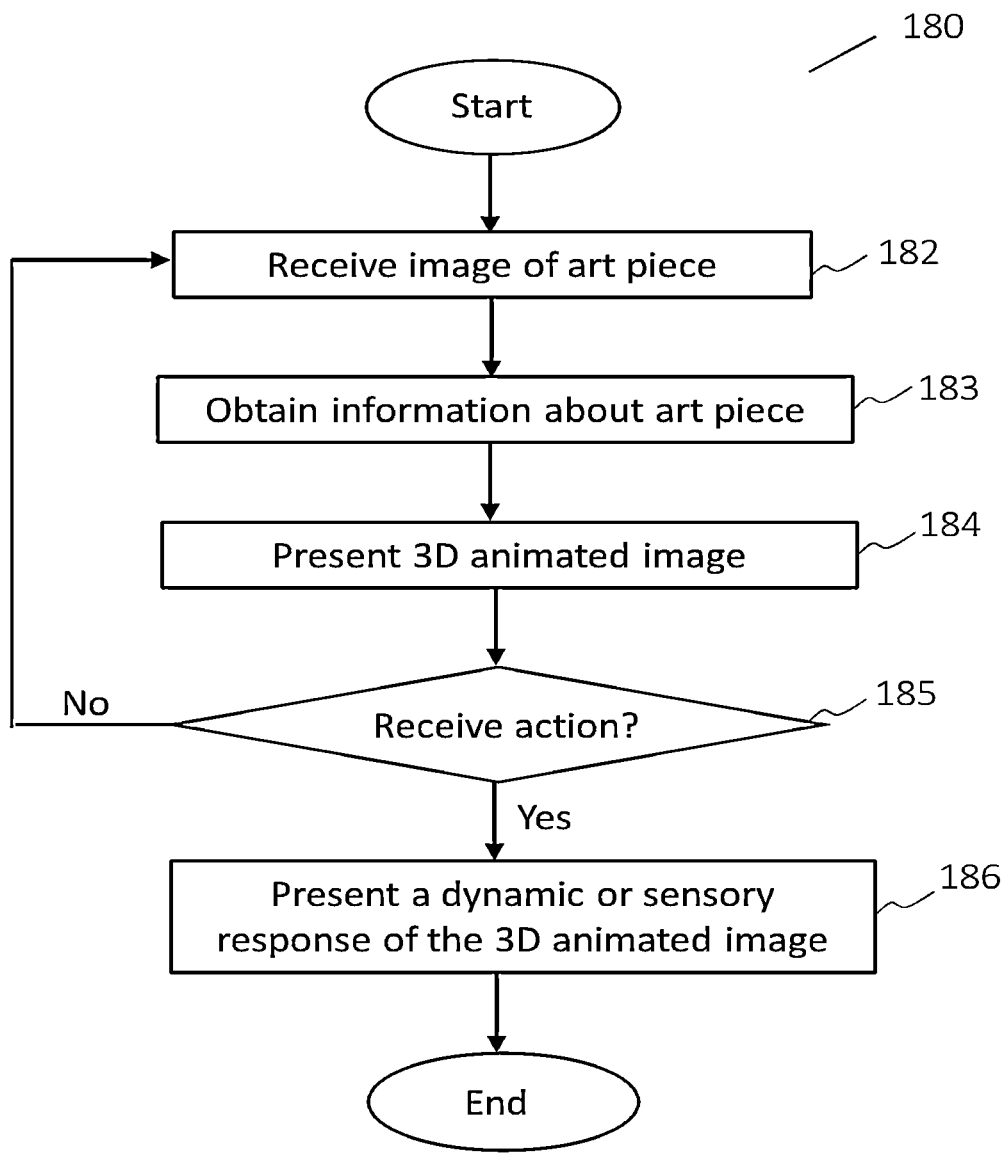
FIG. 20 shows a flowchart of a method to present a dynamic or sensory response of the 3D animated image, according to an example of principles described herein.

Turning to FIG. 4, user interaction with an element 115 of the art image 100 on the user device 114 is shown. This interaction will be described in conjunction with the flowchart 180 in FIG. 20. An image of an art piece is received 182 by the user device 114. Information about the art piece is then obtained 183 by the user device 114. The user device 114 presents 184 a 3D animated image 100 that corresponds with the image. If an action in conjunction with the 3D animated image 100 by the user is received 185, then a dynamic or sensory response of the 3D animated image 100 is presented 186 to the user. As shown in FIG. 4, a finger of a user 118 may touch an element 115 within the 3D animated image 100. This action by the user 118 may be received by the user device 114 and a dynamic or sensory response of the 3D animated image 100 is presented 186. Not all elements may have responses associated with them and therefore not all elements will elicit a response by the user. If no action is received 185, the user device 114 returns to an anticipatory stage to receive 182 an image of an art piece.

Figure 5:
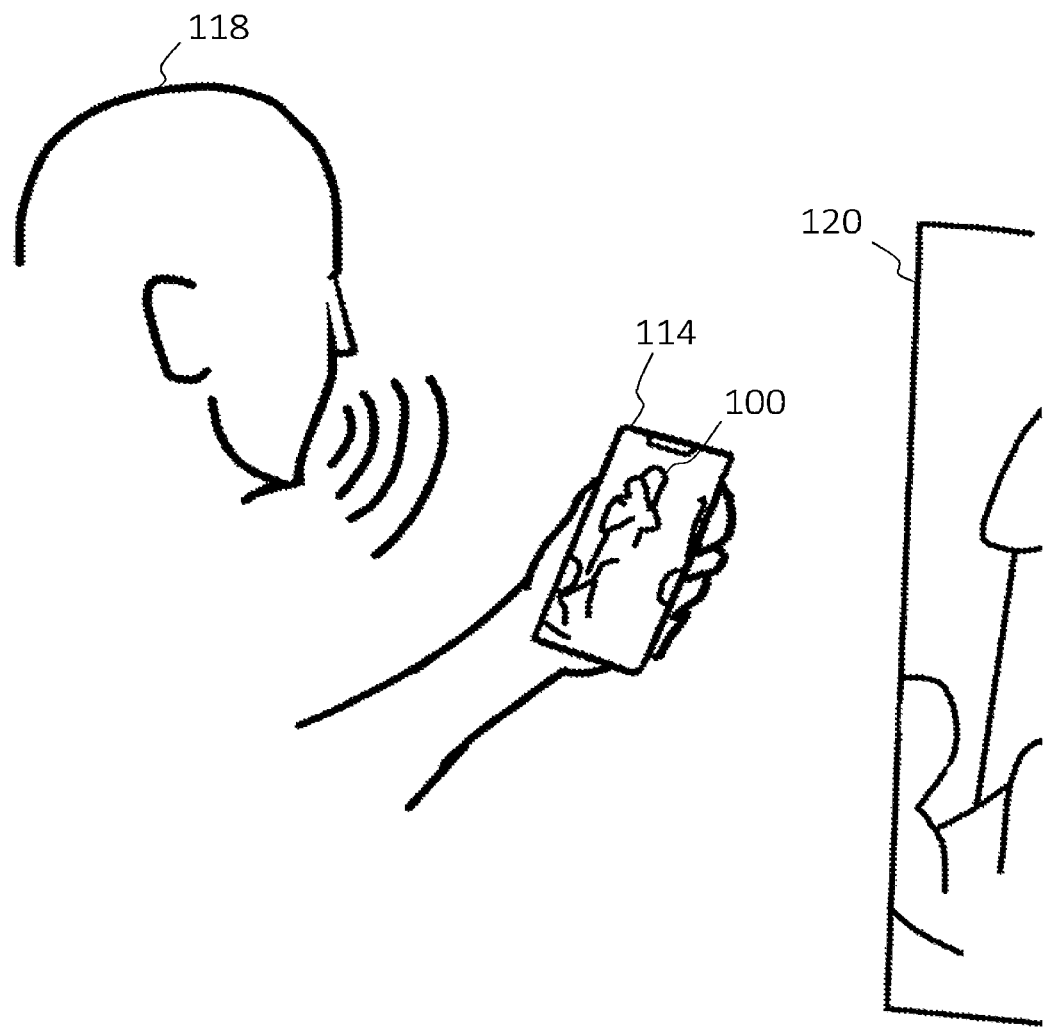
FIG. 5 shows a verbal command as part of a user interaction with an art image on a user device, according to an example of principles described herein.

Note that a user may elicit a response through means other than touch. Turning to FIG. 5, a voice command by the user 118 may be used to elicit a dynamic response of an art image 100 from the user device 114.

The present system therefore provides a dynamic response of the 3D animated image 100 that may not be possible from the actual physical art piece 120 which is stationary. A sensory response is a response that involves a response that targets the senses, such as a verbal response by the 3D animated image 100 or a visual response, such as changing colors of the 3D animated image 100.

Figure 6A:
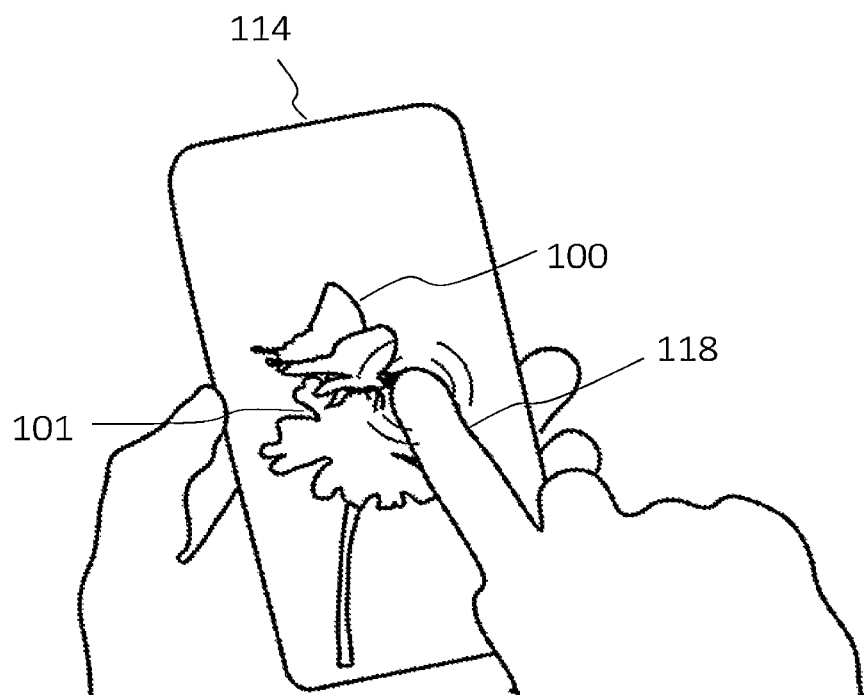
FIG. 6a shows a user interaction with an art image on a user device, according to an example of principles described herein.
Figure 6B:
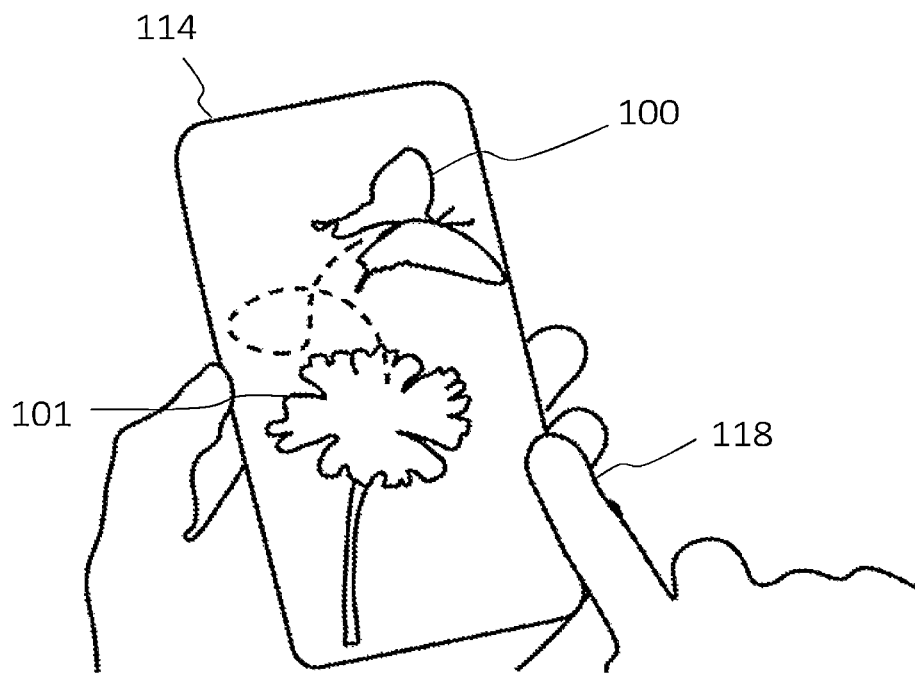
FIG. 6b shows a response to a user interaction with an art image on a user device, according to an example of principles described herein.

As depicted in FIG. 6a, a user 118 may use touch to elicit a dynamic response on the user device 114. As shown, the art image 100 is of a butterfly that is touched by a finger of the user 118. The butterfly is resting on an art image of a flower 101. The touch causes the butterfly to fly away, as shown in FIG. 6b. In this manner, the user has an interactive experience in which the user participates in the environment and explores the various elements.

Note the dynamic or sensory response may also be in accordance with the information about the user and the user surroundings. For example, if the user is color blind, changing colors of an object may be omitted as part of a dynamic response. If music is being played in the background or if the background is noisy, a dynamic response may include automatically increasing the volume of the response for the user to more easily hear.

Figure 7A:
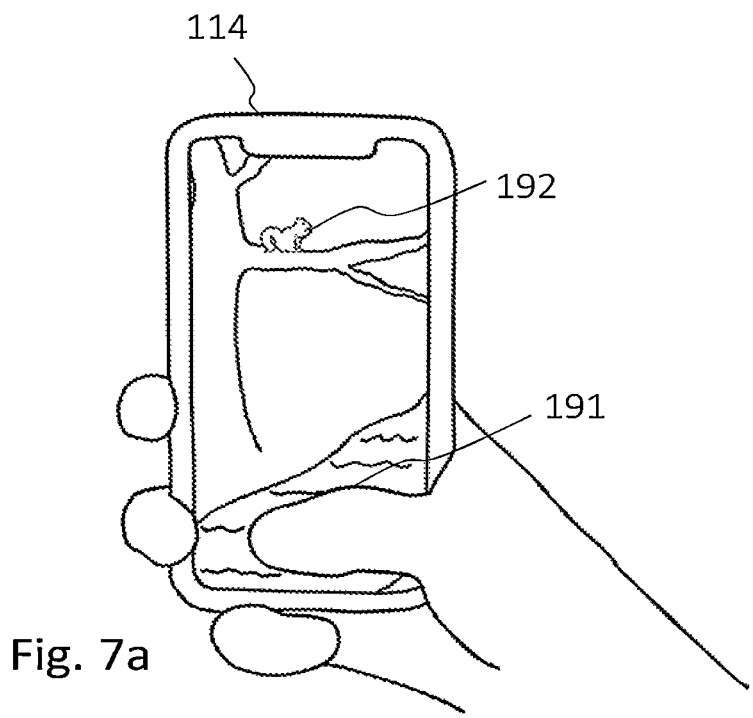
FIG. 7a shows a user interaction with an art image on a user device, according to an example of principles described herein.
Figure 7B:
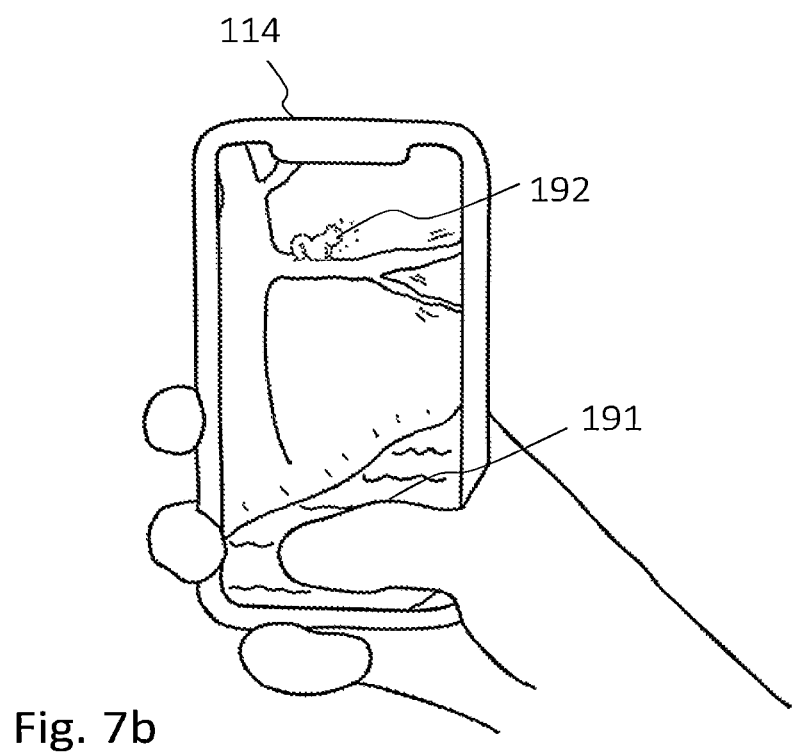
FIG. 7b shows a response to a user interaction with an art image on a user device, according to an example of principles described herein.

Turning to FIG. 7a, another example is shown of various art images 191 and 192 that include dynamic responses that may be elicited by a user. In this example, the user device 114 displays art pieces with art images 191 and 192. Art image 192 is a squirrel while art image 191 is a river. The squirrel art image 192 may make a chattering noise when the user provides an input (e.g., touch, voice command, etc.). The river art image 191 may appear to move and make a rushing water sound after the input. Thus, more than one response from a single art piece is possible. Further examples include that a response may include a subsequent response. For example, the subsequent touch on the rushing water may cause splashing or fish to jump out of the water. A second touch or tap on the squirrel may cause a nut to fall from his hands or cause the squirrel to run further up the tree.

Inputs may include more than a touch or voice command. For example, inputs may include shaking the user device 114 or pushing buttons on the user device 114. More than one kind of input may be used to elicit the same kind of response. In another example, each input is unique to a specific kind of response.

Figure 8A:
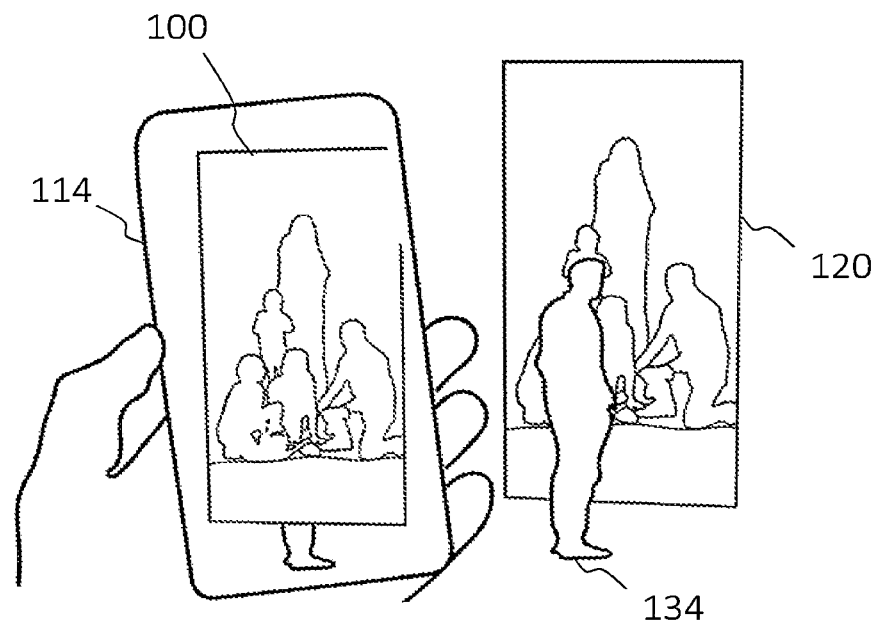
FIG. 8a shows an unobstructed view on a user device, according to an example of principles described herein.
Figure 21:
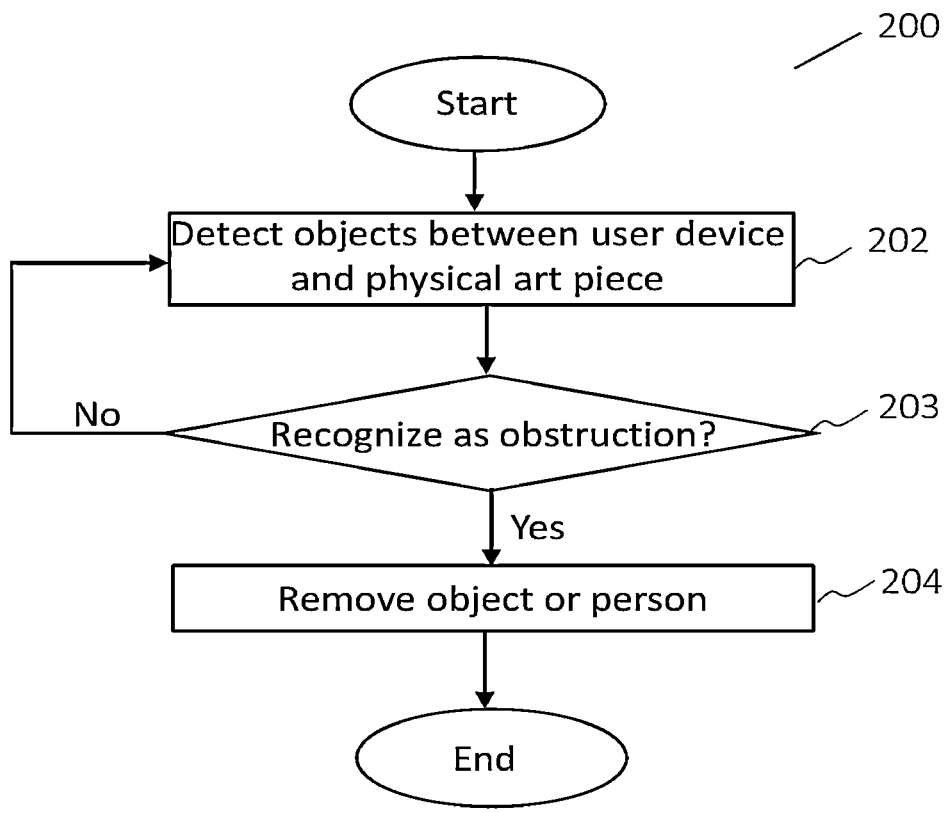
FIG. 21 shows a flowchart of a method to remove an object or person from view on a user device, according to an example of principles described herein.

In an example, the experience is made seamless by removing any obstructions from a view or from an art image 100 presented to the user on the user device 114. Turning to FIG. 8a, a person 134 is shown standing in front of a physical art piece 120. The user device 114 displays the art image 100 on the screen without the person 134. With additional reference to the flowchart in FIG. 21, after a start 200, the user device 114 detects 202 that an obstruction is present, whether it is an object or person. If the user device 114 recognizes 203 that the object or person is an obstruction, the user device 114 removes 204 the obstruction so that the user may continue viewing or interacting with the art image 102 as desired. If the object or person is not recognized 203 as an obstruction, there is no removal of the object or person and the user device 114 waits to detect 202 some other obstruction.

Figure 8B:
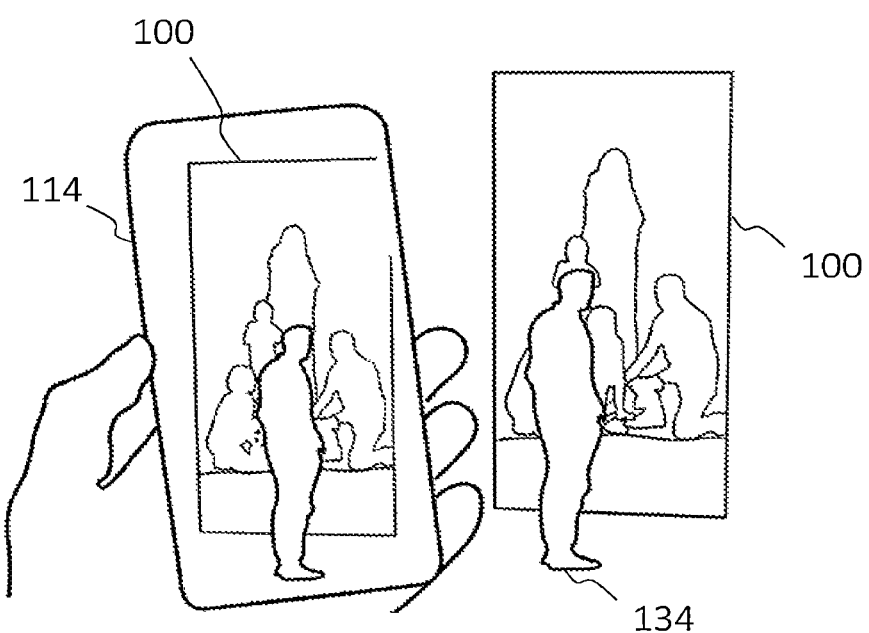
FIG. 8b shows an obstructed view on a user device, according to an example of principles described herein.

FIG. 8b illustrates a configuration where obstructions are not removed. The person 134 is visible on the user device 114. The art image 100 is obscured by the image of the person 134 so that the user cannot fully view the art image 100. In the configuration shown in FIG. 8a, the removal of the object or person obscuring the physical art piece 120 is automatically done by the user device 114 so that the user may not even notice that there was anything present during a viewing experience.

Figure 9:
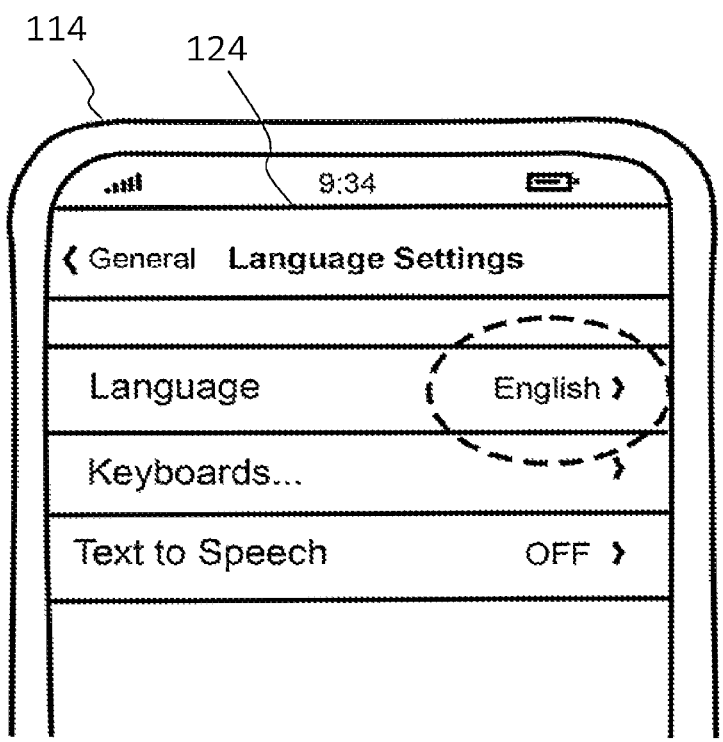
FIG. 9 shows an example of user settings on a user device, according to an example of principles described herein.

User settings on the user device 114 help to provide a unique experience that is tailored to a particular user. In an example, the user sets preferences. In another example, the user device 114 automatically generates preferences. As shown in FIG. 9, the settings on the user device 114 show a language setting 124 with the "English" language circled in dotted lines to indicate selection. The "Text to Speech" setting detects the language of the user to determine the type of language to provide responses and other information to the user. A setting for "Keyboards" allows a keyboard to be displayed so that the user can enter typed commands for interactions.

Settings may further include settings for age, volume, type of dynamic response (e.g., auditory, animated, visual, information, etc.), type of command by user, start destination, end destination, duration of time allocated for each art piece, total time for viewing experience, and other settings.

Figure 10:
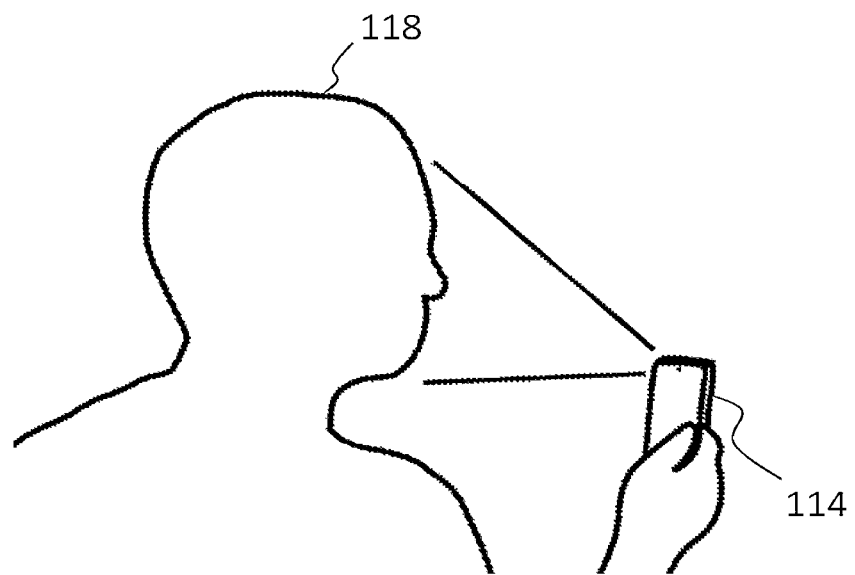
FIG. 10 shows facial recognition by the user device, according to an example of principles described herein.
Figure 11:
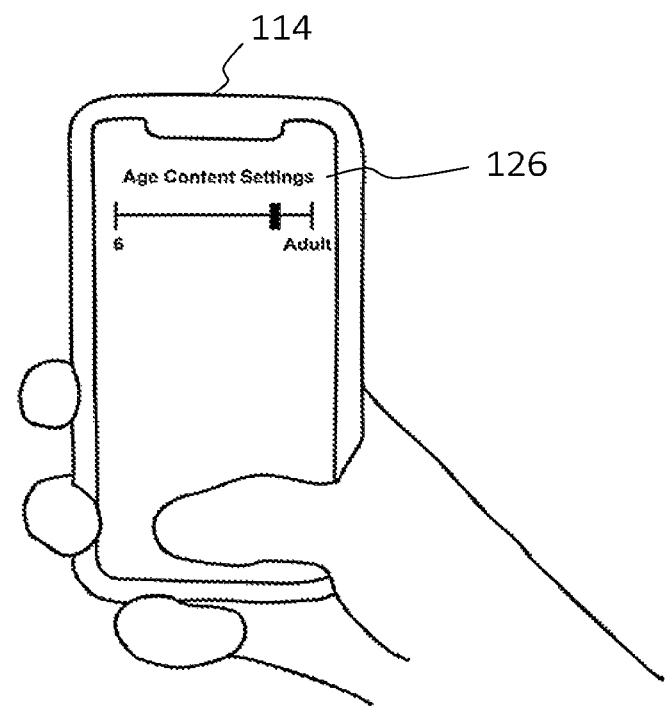
FIG. 11 shows an example of user settings, according to an example of principles described herein.

Settings may be entered manually or through voice command by a user. In another example, settings may be automatically generated by the user device. For example, a user's age may be estimated by the user device. For example, machine learning models may take data points in consideration to determine the user's age. Data points may be taken from which applications are installed, how much time is spent on the applications, metadata accessed by permission, and information about the user device itself (the height of the device, make and model, etc.). In another example, the camera on the user device may take an inventory of the user's face and uses facial recognition program instructions to determine the user's age and other personal identifying features of the user. The program instructions may then use the user's age to provide corresponding information and animated responses to the user. FIG. 10 illustrates a user device 114 collecting information from a user 118 with facial recognition program instructions. In an example, the information is used to allow use of the art experience by the user when the information is recognized by the user device. FIG. 11 illustrates settings 126 on the user device 114 in which the user may manually enter the age of the user, or the level of age that is desired to be used.

Figure 12:
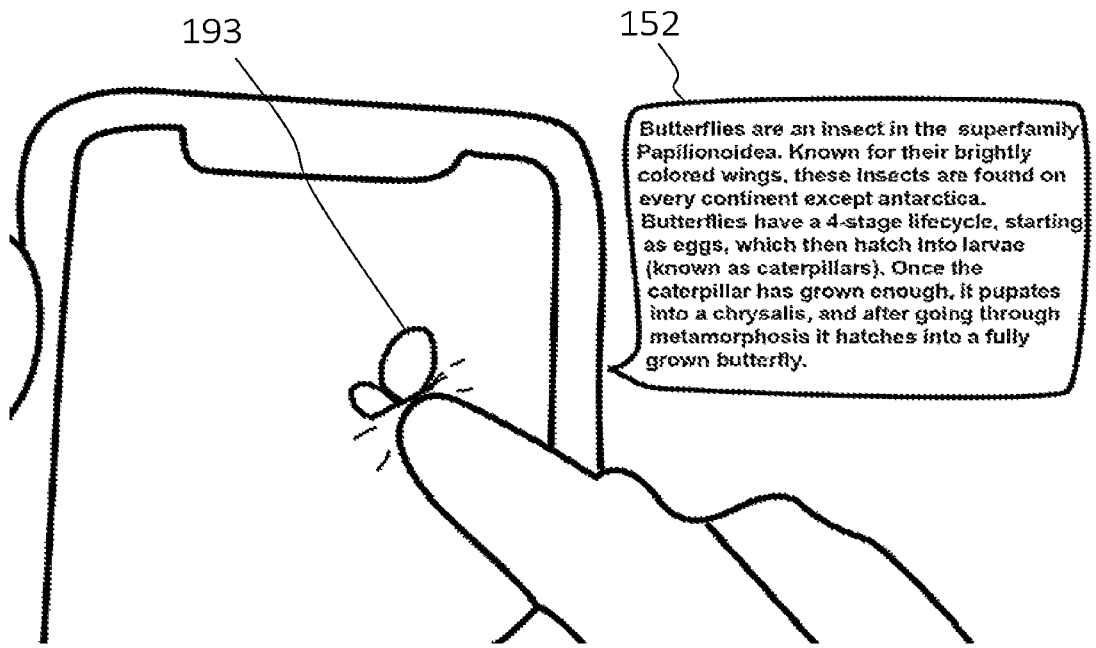
FIG. 12 shows an example of information provided according to user settings or user information, according to an example of principles described herein.
Figure 13:
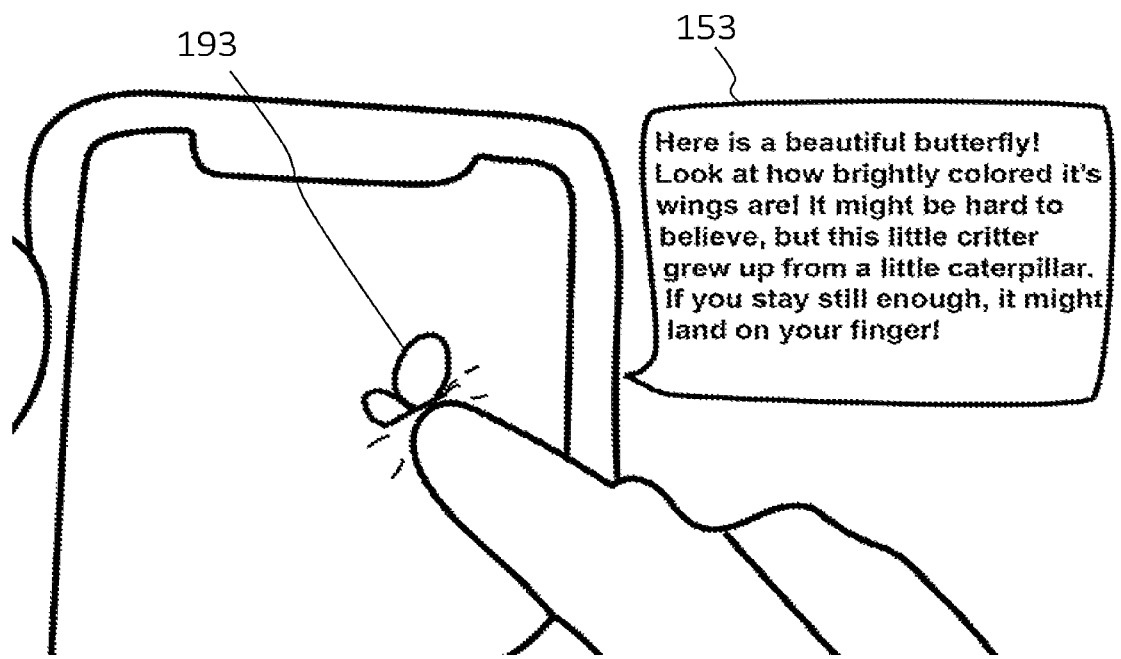
FIG. 13 shows an example of information provided according to user settings or user information, according to an example of principles described herein.

FIG. 12 illustrates information 152 that is used to describe the art image 193 of a butterfly. FIG. 13 also illustrates information 153 that is used to describe the butterfly art image 193. The two types of information correlate with the age of a user. FIG. 12 provides relatively detailed information 152 for an older user, whereas FIG. 13 provides relatively simplified information 153 for a younger user. The information is provided when a user touches the screen, the butterfly art image 193 on the screen, or provides another form of input to trigger the response. In another example, the information is provided automatically during the viewing experience.

Figure 14:
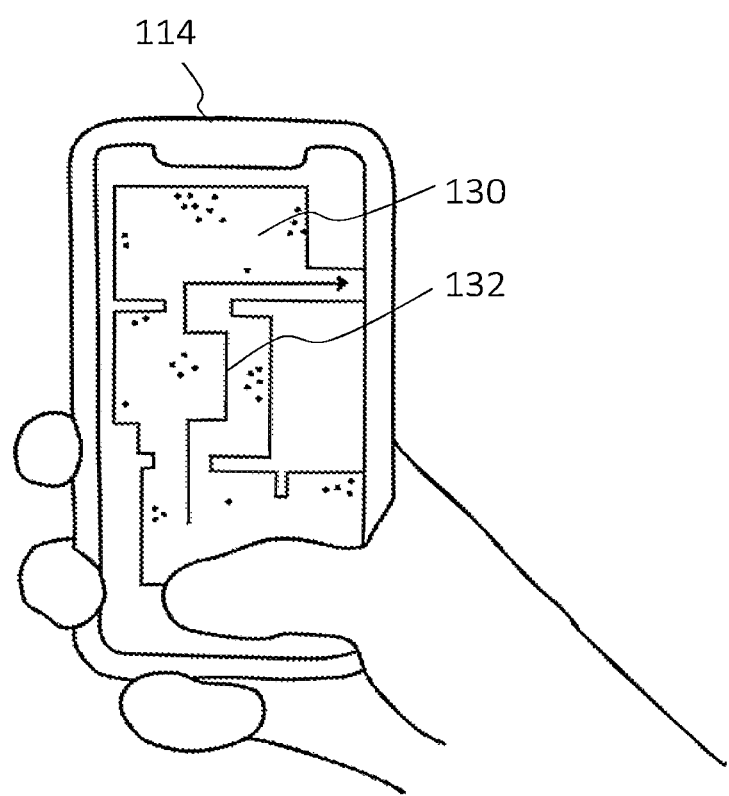
FIG. 14 shows a dynamic user-guided map, according to an example of principles described herein.

The art experience may be further heightened with a map of the surroundings and guidance of the user from art piece to art piece. As shown in FIG. 14, a layout 130 of the user's current floor in a building is shown to help a user establish bearings on the floor. An arrow 132 may also be presented on the layout to assist in guiding a user from start to finish on the current floor to the various art pieces. As the user changes to another floor, the layout may be updated accordingly.

Figure 22:
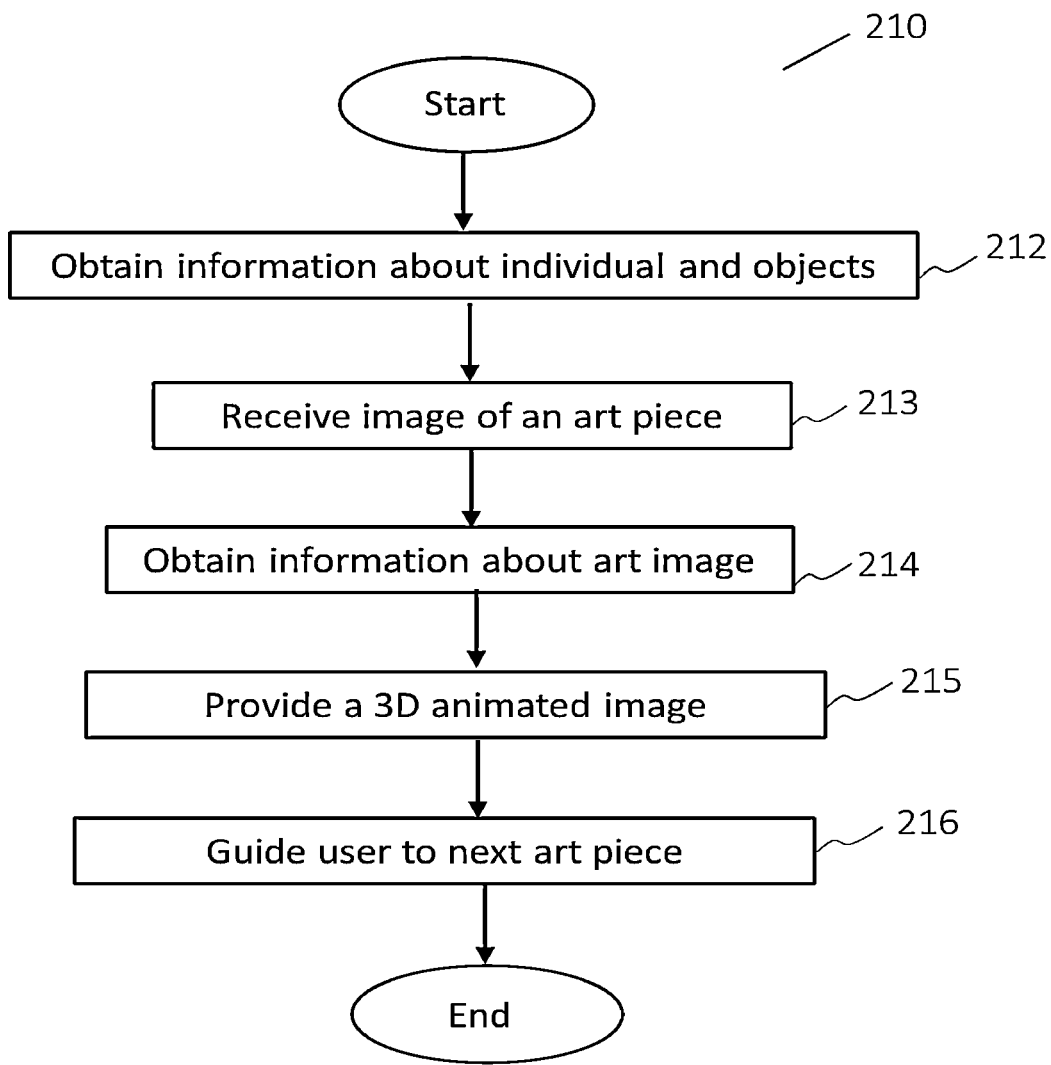
FIG. 22 shows a flowchart of a method to guide a user to a next art piece, according to an example of principles described herein.

In an example, communication is provided to the user to guide the user from art piece to art piece. With reference to FIG. 22, the user device receives 212 information about at least one of an individual and object that are in a proximity or within a viewing venue of the user. The user device receives 213 an image of an art piece. The user device also obtains 214 information about the art piece and provides 215 a 3D animated image of the art piece on the user device. User interaction may follow as described previously. The user is then guided 216 to the next art piece. Movement from art piece to art piece may be according to the user input, or automatically provided by a timer or other setting.

In this manner, the user device may guide the user from congested areas to less congested areas. As such, the user experiences an uninterrupted flow of viewing art pieces from the beginning to the end of a collection of art pieces. The overall experience of attending an art museum may be customized to a given user.

Communication may take the form of verbal, auditory (spoken words, sounds, etc.), visual (e.g., blinking lights, flashes of color, lights on the arrow, etc.), physical (e.g., device vibration, etc.), and hearing-impaired communication (e.g., braille formats, etc.), etc. More than one type of communication may be used. Communication may be automatically changed based on the change in environment. For example, if the user enters a room that is dimly lit, communication may take the form of a physical communication rather than a visual communication to lessen the disturbance of light to others that are in the room. Communication may also take multiple forms. For example, verbal and visual forms of communication may be used together. One form may be used for certain things while the other form is used for other things. In an example, a green light is used to indicate to the user that it is time to move on to another art piece and a verbal cue is provided to the user to indicate to the user the direction in which to go.

Communication to the user may be determined by a setting that is selected by the user or that is automatically generated. In an example, the user device determines that a user is deaf and therefore, communication takes a color and physical form.

Figure 15:
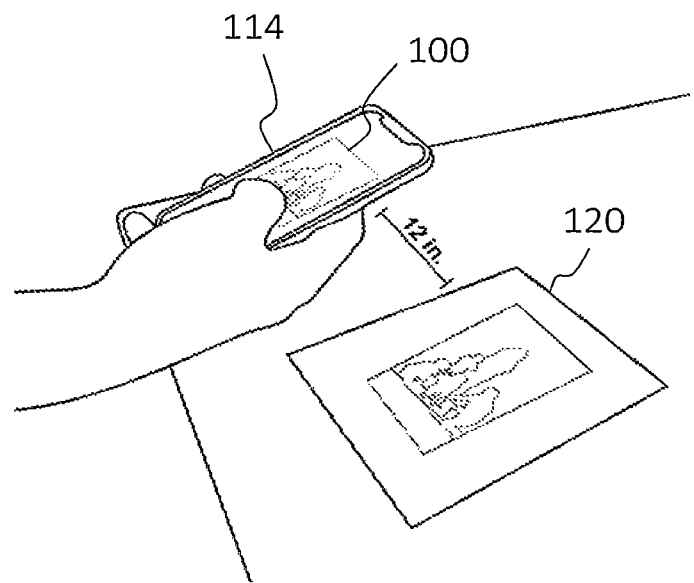
FIG. 15 shows an example of art image acquisition, according to an example of principles described herein.
Figure 16:
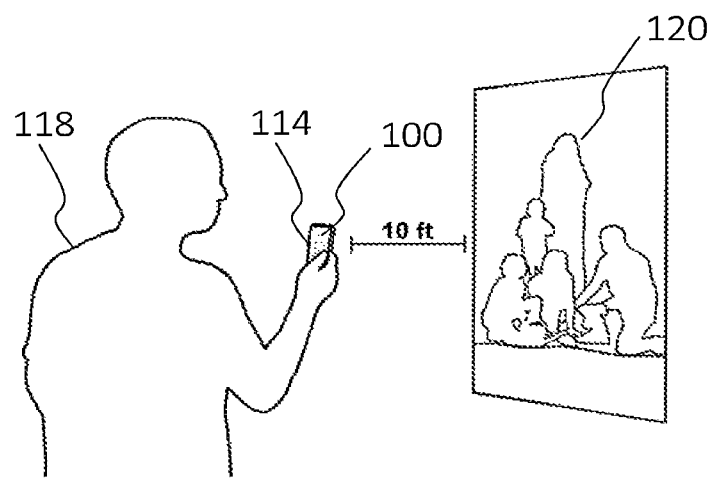
FIG. 16 shows an example of art image acquisition, according to an example of principles described herein.

In an example, when viewing an art piece, the distance from the user device to the art piece does not make a difference in resolution to the art image that appears on the user device. Turning to FIG. 15, a distance of 12 inches may not affect the resolution of the art image 100 that appears on the user device 114. Turning to FIG. 16, a longer distance of 10 ft also may not affect the resolution of the art image 100 that appears on the user device 114. That is, each art image 100 fits on the screen of the user device 114 with the same or similar dimensions, clarity, or the like regardless of a capture distance so that the user has the same or similar viewing experience.

Figure 17:
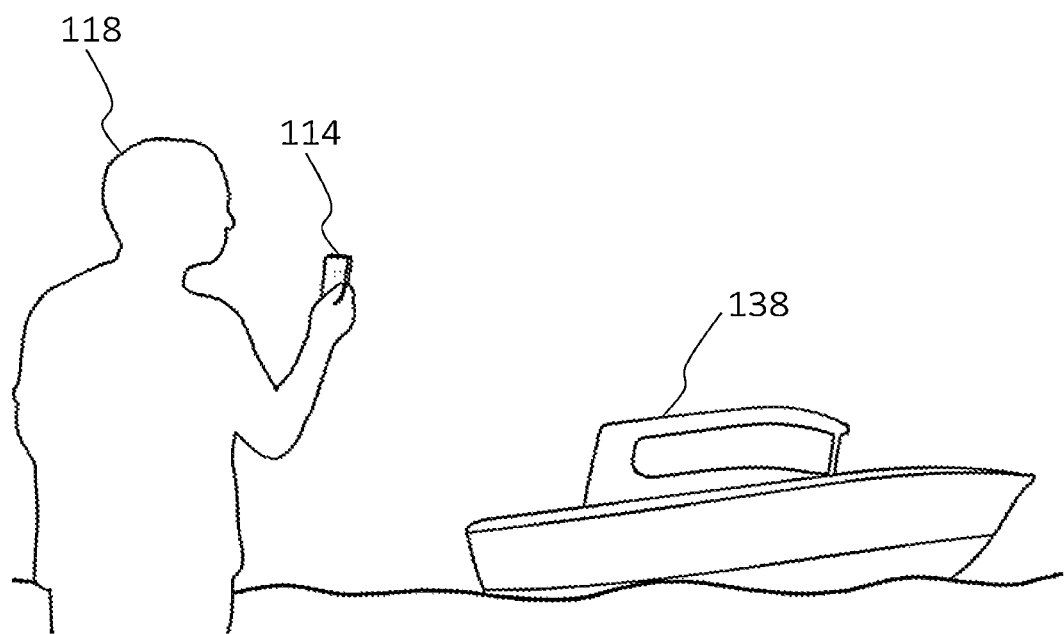
FIG. 17 shows an example of art image acquisition, according to an example of principles described herein.
Figure 18:
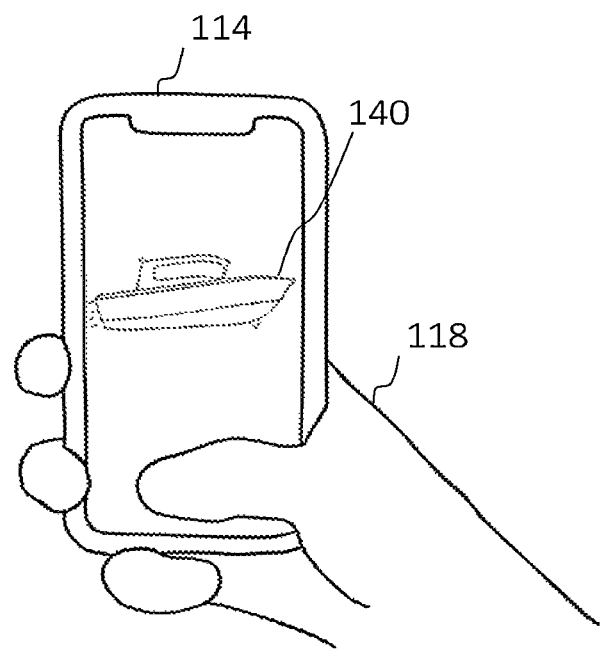
FIG. 18 shows an example of art image acquisition, according to an example of principles described herein.

The viewing experience described extends beyond art pieces and art galleries. The viewing experience may also find application to everyday objects found in other environments. Turning to FIG. 17, a physical object in the form of a boat 138 is detected by a user device 114 as the user 118 holds the user device 114 up to view the physical artwork of the boat 138. The image 140 of the boat appears on the user device 114.

Like the art images described above, the boat art image 140 may have information that is used by recognition program instructions to obtain information about the boat. Personal features of the boat art image 140 may be used to animate the boat art image 140 as well as surroundings of the boat art image 140. In an example, the user may interact with the boat art image 140 to make things happen. For example, the user may touch the boat art image 140 to make a boat horn blow. In another example, the user touching the boat art image 140 makes the water underneath the boat art image 140 have a ripple effect. In another example, information about the boat's make and model appears on the screen of the user device 114. Other dynamic responses are anticipated according to principles described herein.

FIG. 23 depicts a non-transitory computer readable storage medium 230, according to an example of the principles described herein. To achieve its desired functionality, a computing system includes various hardware components. Specifically, a computing system includes a processor and a computer readable storage medium 230. The computer readable storage medium 230 is communicatively coupled to the processor. The computer readable storage medium 230 includes a number of instructions (232, 233, 234, 235, 236, 237, 238) for performing a designated function. The computer readable storage medium 230 causes the processor to execute the designated function of the instructions (232, 233, 234, 235, 236, 237, 238). The computer readable storage medium 230 can store data, programs, instructions, or any other machine-readable data. Computer readable storage medium 230 can store computer readable instructions that the processor can process, or execute. The computer readable storage medium 230 can be an electronic, magnetic, optical, or other physical storage device that contains or stores executable instructions. Computer readable storage medium 230 may be, for example, Random Access Memory (RAM), an Electrically Erasable Programmable Read-Only Memory (EEPROM), a storage device, an optical disc, etc. The computer readable storage medium 230 may be a non-transitory machine-readable storage medium 230.

Figure 24:
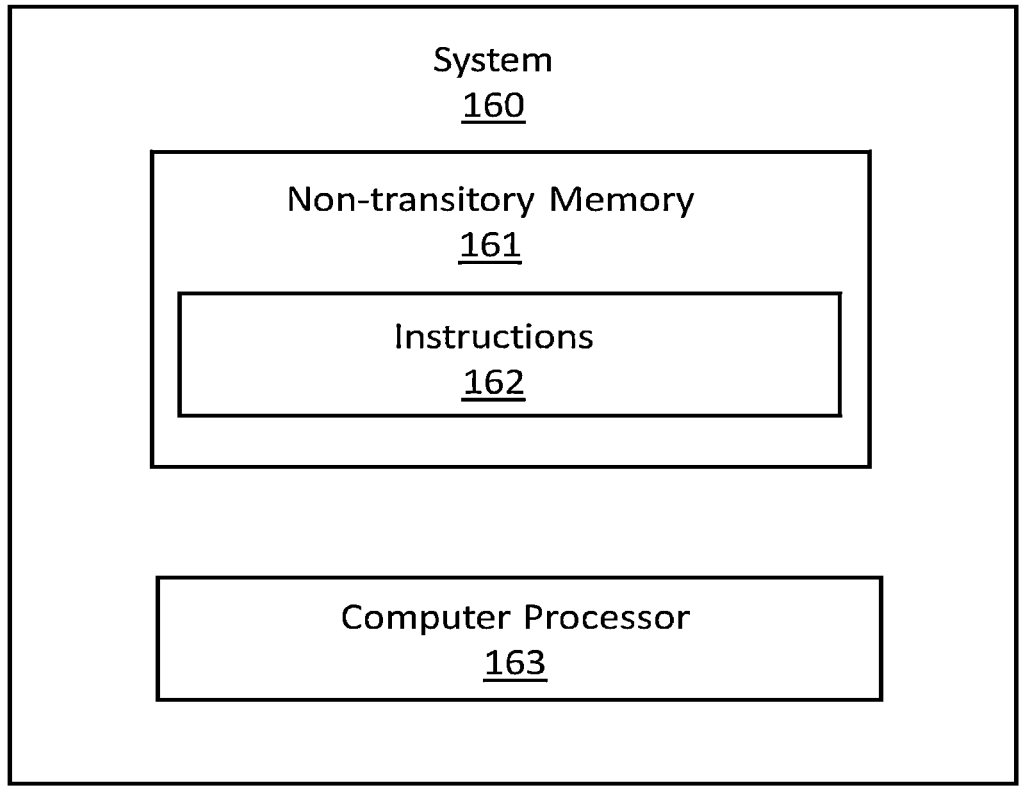
FIG. 24 shows a system that provides a user with an art image experience, according to an example of principles described herein.

It is also contemplated that principles discussed herein be accomplished through a system. Turning to FIG. 24, a block diagram of a system 160 includes a non-transitory memory 161 that stores instructions 162, such as those described above, and a computer processor 163 that executes the instructions 162 to implement virtualization as discussed herein. Instructions 162 to perform operations include obtain user information 232 for obtaining unique information and personal settings of a user. Further instructions 162 include receive an image of an art piece 233 for receiving an image by a user device. For example, receiving an image of an art piece 233 can include the user providing an image, such as by the user taking a photo or video of a physical art piece 120. The image taken by the user's camera can nearly immediately be substituted for an image 100 that has been modified from the image taken of the physical art piece 120 (such as a modified image 100 that has had obstructions removed according to the method set forth in FIG. 21).

Instructions 162 also include obtain information about the art piece 234 so as to obtain identifying information about the art piece. Alternatively, the instructions 162 can allow a user device to receive identifying information about the art piece. For example, a database with details relating to numerous art pieces can be kept and the database can send details relating to information about the art piece to the user device. Present a 3D animated image 235 is to present a 3D animated based on the image of the art piece. Receive an action by the user 236 is to receive inputs, whether by touch or voice or command, or other directive. Present a dynamic or sensory response 237 is to present such movement, sound, or color change, or other response to the action by the user. Guide the user to a next physical art piece 238 is to provide guidance, whether verbal or by visual display on the user device, to a next art piece. This can ensure better traffic flow throughout an art display and result in an enhanced user experience.

Examples of systems and mediums may include one or more of standalone devices, machines, networks, etc. This may include the use of one or more of a client, server, control system, network router, switch or bridge, any machine capable of executing a set of instructions that specify actions to be taken by the machine, etc.

ASPECTS OF THE DISCLOSURE

Aspect 1: A method for providing an animated art experience to a user, comprising:
    receiving, by a user device, a 2-dimensional image of an art piece selected by the user device;
    receiving, by a user device, information about the art piece;

presenting to a user via the user device a three-dimensional art image of the 2-dimensional image of the art piece;

receiving an action caused by a rotation or tilt of the user device; and in response to the action, providing a depth perspective view of the three-dimensional art image at an associated viewer angle of the action such that further portions of the three-dimensional art image become visible, and a background and a foreground of the three-dimensional art image appear to move in correlation with the action and the associated viewer angle of the action.

Aspect 2: The method of Aspect 1, further comprising the user device receiving information about the art image for 360 degrees of navigation in which the user may view the art image from different angles.

Aspect 3: The method of Aspect 1 or Aspect 2, further comprising presenting to a user at the user device at least one visual or aural layer in conjunction with the art image.

Aspect 4: The method of any one of Aspects 1-3, further comprising presenting the visual or aural layer with a dynamic or sensory response.

Aspect 5: The method of any one of Aspects 1-4, wherein the visual or aural layer includes a response that is reflected in 3D as viewed from the different angles.

Aspect 6: The method of any one of Aspects 1-5, further comprising the steps of recognizing a presence of persons and surroundings in an environment in which the art piece and at least one second art piece are present, and guiding the user to the second art piece in a manner that balances the presence of persons within the environment.

Aspect 7: The method of any one of Aspects 1-6, further comprising automatically removing an obstruction that comes within a camera view of the user so that the art image remains unobscured even when the camera view of the user would otherwise be blocked by the obstruction.

Aspect 8: The method of any one of Aspects 1-7, further comprising scaling and formatting the art image to fit within a user screen of the user device regardless of a distance of the user from the art piece or movement of the user with respect to the art piece.

Aspect 9: The method of any one of Aspects 1-8, further comprising:
receiving an image of a physical object selected by the user;
obtaining information about the physical object; and
based on the information, presenting a 3D animated image that corresponds with the physical object selected by the user; and
presenting at least one dynamic or sensory response of the 3D animated image in accordance with the information obtained about the physical object.

Aspect 10: The method of any one of Aspects 1-9, further comprising:
recognizing at least one person or physical object that is not stored in a database;
presenting a 3D animated image that corresponds with the at least one person or physical object; and
presenting at least one dynamic or sensory response of the 3D animated image.

Aspect 11: A method for providing an animated art experience to a user, comprising:
receiving an image of an art piece selected from a user device;
receiving information about the art piece;
presenting at a user device a 3D animated image that corresponds with the art piece;
receiving an action by the user in conjunction with the 3D animated image; and
presenting at least one dynamic or sensory response of the 3D animated image in accordance with the action of the user.

Aspect 12: The method of Aspect 11, further comprising:
obtaining personal information about the user;
providing to the user, based on the personal information of the user, a communication that is related to the 3D animated image; and
presenting at least one dynamic response of the 3D animated image in accordance with the information about the user.

Aspect 13: The method of Aspect 11 or Aspect 12, further comprising providing the communication in a language based on the personal information obtained about the user.

Aspect 14, the method of any of Aspects 11-13, further comprising providing the communication in at least one of visual, auditory, or braille format.

Aspect 15: The method of any of Aspects 11-14, further comprising:
providing different levels of communication, and
providing the communication that is related to the 3D animated image at a level of communication that is based on the personal information about the user.

Aspect 16: The method of any one of Aspects 11-15, further comprising:
detecting information about a surrounding of the user;
providing communication to guide movement of the user based on the information about the surroundings.

Aspect 17: The method of any one of Aspects 11-16, further comprising:
providing communication to guide movement of the user based on the personal information of the user.

Aspect 18: A method for providing an animated art experience to a user, comprising:
obtaining information about individuals and objects in proximity to the user;
receiving an image of an art piece from a user device;
receiving information about the art piece;
presenting a 3D animated image that corresponds with the image of the art piece and that provides at least one dynamic response to a user input; and
guiding the user to a next art piece based on the individuals and objects in the proximity to the user.

Aspect 19: The method of Aspect 18, further comprising:
obtaining information about the user, including at least one of audio, visual, and tactile information,
providing to the user, based on the information, a corresponding communication that is related to the 3D animated image.

Aspect 20: The method of Aspect 18 or Aspect 19, further comprising:
presenting the at least one dynamic response of the 3D animated image to reflect an age and language of the user.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for providing a customized animated art experience to a user, the method comprising:

selectively receiving an image of an art piece from a user device, the image being a digital representation of the art piece;

receiving information about the art piece;

receiving information about the user;

receiving information about the user device;

generating a three-dimensional (3D) animated image of the art piece based on the received image, the received information about the art piece, the received information about the user, and the received information about the user device, wherein the 3D animated image is a digital representation of the art piece that simulates depth and perspective, and wherein the 3D animated image includes a background and a foreground to provide a 360° view of the art piece; and generating a depth plan of the 3D animated image, wherein the background and the foreground are placed in the depth plan and a position of the background and the foreground appears to differ when the 3D image is viewed from one or more viewing angles through the user device.

2. The method of claim 1, wherein receiving information about the art piece comprises:

receiving information about one or more sub-images of the art piece;

receiving information about patterns within the art piece; and receiving information about colors within the art piece.

3. The method of claim 2, further comprising detecting the one or more sub-images of the art piece and animating the one or more sub-images.

4. The method of claim 1, wherein receiving information about the user comprises:

receiving information about an age of the user; and receiving information about a preferred language of the user.

5. The method of claim 1, wherein receiving information about the user device comprises receiving information about settings, dimensions, and a model of the user device.

6. The method of claim 1, further comprising:

identifying a presence of people in front of the art piece; and removing the people from the 3D animated image presented at the user device.

7. The method of claim 6, further comprising guiding the user to a second art piece based on the identified presence of people in front of the art piece.

8. The method of claim 1, further comprising:

receiving an action caused by a rotation or tilt of the user device, the action having a first associated viewer angle and a second associated viewer angle; and in response to the action, providing to the user, on the user device, a depth perspective view of an entirety of the 3D animated image at the first associated viewer angle of the action and providing to the user a depth perspective view of an entirety of the 3D animated image at the second associated viewer angle of the action, such that further portions of the 3D animated image become visible, including a plurality of sub-images, and the background and the foreground of the 3D animated image appear to move in correlation with the action and the first associated viewer angle and the second associated viewer angle of the action, the background comprising a plurality of background sub-images and the foreground comprising a plurality of foreground sub-images, and wherein at least one of the plurality of background sub-images and at least one of the plurality of foreground sub-images appear to move in correlation with the action and the first associated viewer angle and the second associated viewer angle of the action.

9. The method of claim 8, wherein the at least one of the plurality of background sub-images is presented at the user device as though the at least one of the plurality of background sub-images has three dimensions.

10. The method of claim 8, wherein the at least one of the plurality of foreground sub-images is presented at the user device as though the at least one of the plurality of foreground sub-images has three dimensions.

11. The method of claim 8, wherein the background and the foreground appear to move relative to the 3D animated image.

12. The method of claim 1, further comprising changing the background.

13. A method for providing a customized animated art experience to a user, the method comprising:

identifying an art piece from a received image of the art piece from a user device, the image being a digital representation of the art piece;

receiving information about the art piece;

receiving information about the user;

receiving information about the user device;

generating a three-dimensional (3D) animated image of the art piece based on the received image, the received information about the art piece, the received information about the user, and the received information about the user device, wherein the 3D animated image is a digital representation of the art piece that simulates depth and perspective, and wherein the 3D animated image includes a background and a foreground to provide a 360° view of the art piece;

generating a depth plan of the 3D animated image, wherein the background and the foreground are placed in the depth plan and a position of the background and the foreground appears to differ when the 3D image is viewed from one or more viewing angles through the user device; and presenting at least one visual or aural layer in conjunction with the 3D animated image based on the received image, the received information about the art piece, the received information about the user, and the received information about the user device.

14. The method of claim 13, further comprising removing portions of the image of the art piece and filling in missing portions with a new background to provide the 360° view of the art piece.

15. The method of claim 13, wherein the at least one visual or aural layer includes a response that is reflected in 3D as viewed from the one or more viewing angles.

16. The method of claim 13, further comprising presenting the at least one visual or aural layer with at least one dynamic response of the 3D animated image, the at least one dynamic response comprising one or more animation sequences of one or more of a plurality of sub-images of the 3D animated image.

17. The method of claim 16, further comprising presenting the at least one dynamic response of the 3D animated image to reflect an age or language of the user.

18. The method of claim 13, further comprising presenting the at least one visual or aural layer with a plurality of dynamic or sensory responses of the 3D animated art image.

19. A method for providing a customized animated art experience to a user, the method comprising:
selectively receiving an image of an art piece from a user device, the image being a digital representation of the art piece;
receiving information about the art piece;
receiving information about the user;
receiving information about the user device;
generating a three-dimensional (3D) animated image of the art piece based on the received image, the received information about the art piece, the received information about the user, and the received information about the user device,
wherein the 3D animated image is a digital representation of the art piece that simulates depth and perspective, and
wherein the 3D animated image includes a background and a foreground to provide a 360° view of the art piece; and
generating a correlation function for controlling a movement of the background and the foreground relative to the 3D animated image, the correlation function for controlling the movement of the background and the foreground in a coordinated and aesthetically pleasing manner.

20. The method of claim 19, further comprising:
receiving an image of a physical object selected by the user;
obtaining information about the physical object; and
based on the information, presenting a 3D animated image that corresponds with the physical object selected by the user; and
presenting at least one dynamic or sensory response of the 3D animated image in accordance with the information obtained about the physical object.

* * * * *